(12) United States Patent
Allegrucci

(10) Patent No.: US 6,792,527 B1
(45) Date of Patent: Sep. 14, 2004

(54) METHOD TO PROVIDE HIERARCHICAL RESET CAPABILITIES FOR A CONFIGURABLE SYSTEM ON A CHIP

(75) Inventor: Jean-Didier Allegrucci, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 603 days.

(21) Appl. No.: 09/746,764

(22) Filed: Dec. 22, 2000

(51) Int. Cl.[7] .................. G06F 12/14; G06F 12/16; G06F 1/26; G01R 31/28

(52) U.S. Cl. ............... 713/1; 711/166; 713/322; 713/323; 714/725

(58) Field of Search ................ 711/166; 365/227; 395/651, 800; 326/38; 364/200; 710/128, 3, 302; 713/320, 1, 2; 714/24, 30; 327/142

(56) References Cited

U.S. PATENT DOCUMENTS

| | | | | |
|---|---|---|---|---|
| 4,407,016 A | * | 9/1983 | Bayliss et al. .................. 710/3 |
| 5,155,856 A | * | 10/1992 | Bock et al. ..................... 713/1 |
| 5,576,650 A | * | 11/1996 | Hirotani et al. ............. 327/142 |
| 5,860,125 A | * | 1/1999 | Reents ........................ 713/320 |
| 5,870,602 A | * | 2/1999 | Miller et al. .................... 713/1 |
| 5,928,359 A | * | 7/1999 | Lee ............................... 713/1 |
| 5,948,090 A | * | 9/1999 | Heinrich et al. ............ 710/302 |
| 6,076,172 A | * | 6/2000 | Kimura et al. ................ 714/24 |
| 6,262,594 B1 | * | 7/2001 | Cheung et al. ............... 326/38 |

* cited by examiner

Primary Examiner—Thomas Lee
Assistant Examiner—Chi Whan Chung
(74) Attorney, Agent, or Firm—Jeffery S. Smith

(57) ABSTRACT

A method to provide hierarchical reset capabilities for a configurable system on a chip is disclosed. The method includes determining a plurality of reset functions, and establishing a reset hierarchy among the plurality of reset functions.

15 Claims, 3 Drawing Sheets

METHOD TO PROVIDE HIERARCHICAL RESET CAPABILITIES FOR A CONFIGURABLE SYSTEM ON A CHIP

FIELD OF INVENTION

The present invention is related to a system on a chip.

BACKGROUND

Electronic devices or systems have some kind of initialization mechanism. In general, slave systems or sub-systems are reset through a dedicated reset pin. The reset signal is routed to important memory elements and forces initial conditions. Some systems have internal reset circuits that generate an internal reset pulse upon power-on. Some sub-modules of a system, like a CPU, are also selectively reset. Various other application reset resources are commonly used such as software or watchdogs resets. Various systems require some combinations of reset. However, all these methods have never been assembled into a single architecture that serves the stringent requirements of configurable system-on-chip.

SUMMARY OF THE INVENTION

A method to provide hierarchical reset capabilities for a configurable system on a chip is disclosed. The method includes determining a plurality of reset functions, and establishing a reset hierarchy among the plurality of reset functions.

These features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A hierarchical reset structure is described that serves all the initialization requirements of a configurable system on a chip. All the initialization requirements of a configurable system on a chip as served through a simple hierarchical logic implementation.

Figure 1:
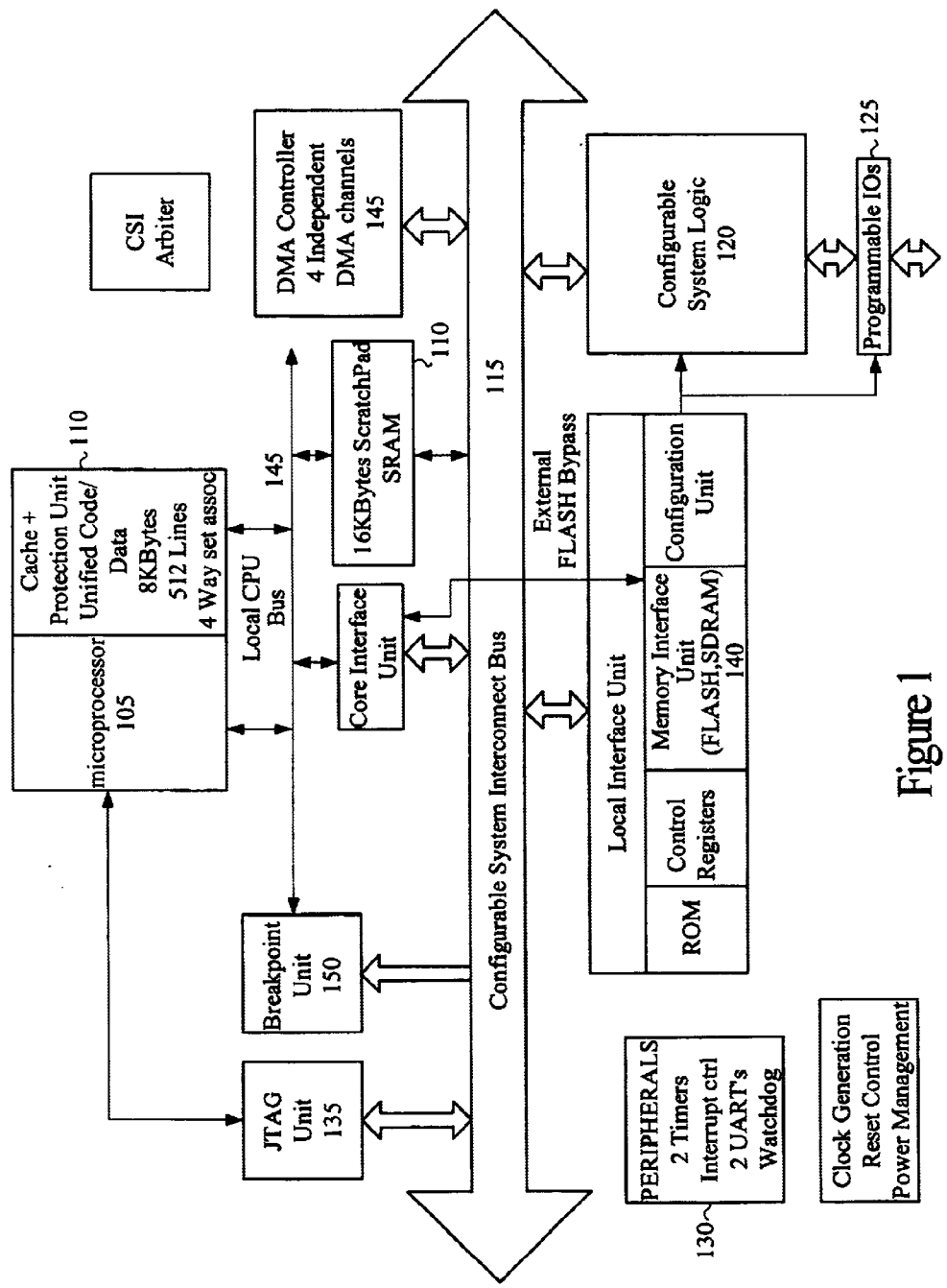
FIG. 1 shows an embodiment of a system on a chip.

As shown in FIG. 1, the system on a chip integrates, on a single device, an embedded microprocessor 105, internal static ram (cache+scratchpad) 110, a high-speed dedicated system bus 115, and configurable logic 120, which are connected to the microprocessor 105 and system bus 115. The result is a high performance, integrated, fully static single chip system for embedded systems applications.

In one embodiment, the microprocessor 105 is a general-purpose 32-bit microprocessor, which supports the standard ARM 32-bit instruction set and reduced 16-bit instruction set.

The microprocessor 105 is paired with a memory 110, which may include 8 Kbyes unified code/data cache and 16 Kbytes scratch pad for storage of timing critical code or data structure, for example. The cache and additional memories may be used to improve the overall performance of the system.

The configurable logic, 120, may be an embedded SRAM-based Configurable System (CSL) matrix, for example. The configurable logic 120 can provide "derivative on demand" system customization. The high-performance configurable logic architecture 120 may include a highly interconnected matrix of CSL cells, for example. Resources within the matrix provide easy, seamless access to and from the internal system bus 115. Each CSL cell performs various potential functions, including combinatorial and sequential logic. The combinatorial portion performs Boolean logic operations, arithmetic functions, and memory. The sequential element performs independently or in tandem with the combinatorial function. The abundant programmable input/output blocks (PIOs) 125 provide the interface between external functions and the internal system bus or configurable system logic. Each PIO offers advanced I/O options including selectable output drive current, optional input hysteresis, and programmable low-power functionality during power-down mode.

A high-performance internal system bus 115, which may be a Configurable System Interconnect (CSI) bus, for example, interconnects the microcontroller 105, its peripherals 130, and the CSL matrix 120 at a speed of 66 MHz, for example. In one embodiment, the bus 115 provides 32 bits of read data, 32 bits of write data, and a 32-bit address. Multiple masters arbitrate for bus access. Potential bus masters include the microcontroller 105, the JTAG interface 135, the read and write channels of each DMA channel, and the memory interface unit 140 (MSSIU) in some modes of operation. Functions implemented in the CSL matrix 120 can use a DMA channel as a "proxy" master, re-using the control logic already contained in the DMA channels to become a master on the CSI bus 115. The CSI, as well as the local CPU bus 145, may follow the little endian format.

A static memory interface unit (part of the memory sub-system MSSIU 140) connects the configurable processor 120 to external static memories of the type FLASH or SRAM. The MSSIU 140 can connect to an external FLASH memory device that holds an initialization program plus the user's code. The MSSIU interface is reusable for connections to other external components. The external read, write, control, and chip-select signals are programmable providing flexible set-up, strobe, and hold timing. A direct connection from the CPU 105 to the MSSIU 140 (bypass mode) is provided to remove any additional latency incurred going through the CSI 120. For low frequency applications, the microprocessor 105 can fetch its instructions from the external FLASH directly. Assuming a FLASH with a one cycle access time, non-sequential accesses from the microprocessor incur one wait state, while sequential accesses incur no wait states.

Support for external dynamic memories provides the user with some of adding affordable and dense memories to the system. A SDRAM interface unit (part of MSSIU 140) connects the system interconnect to a variety of SDRAM types and configurations. It also supports 100-pin DIMMs. The interface can runs at 66 MHz, for example, and provides ways to optimize the interface timing for slower clocks. SDRAMs can be used as temporary memory mostly for DMA data buffering. A direct connection from the CPU 105 to the SDRAM interface 140 is also provided to remove additional CSI latency.

The pins may be shared between the FLASH and SDRAM interfaces. To provide maximum use of the CSI bandwidth and external memory bus, the cache should be enabled. A cache miss results in the CPU using the external memory bus. Minimizing the miss rate allows the higher use of the external memory bus for DMA data movement to and from SDRAM.

The four-channel DMA controller 145 provides high-bandwidth communication between functions. Its easy-to-use handshake simplifies interface and control logic. Functions from within the CSL matrix can request DMA transfers, the DMA controller providing "proxy" bus mastering capabilities. Each DMA channel can be controlled directly by the CPU or through a descriptor table that can reside anywhere within the system memory.

A set of common dedicated peripherals 130 is available. In one embodiment, the set includes 2 16-bit with pre-scalers, 2 serial controllers, a watchdog timer and an interrupt controller.

The majority of the system, including the microcontroller, can operate from a single bus clock signal. Optional sources for the bus clock include driving it directly from an off-chip signal, connecting an external crystal or ceramic oscillator between the dedicated crystal-oscillator amplifier pins and synthesizing a clock frequency through the on-chip PLL, or using the internal ring oscillator. Six other global buffers provide high-fanout signals to CSL functions. The bus clock and the global buffers can optionally be stopped upon a breakpoint event and shut off during power-down mode.

Power management control provides selectable power-down options over internal functions. Furthermore, each PIO provides pin-by-pin power-down settings. An internal initialization boot ROM controls the start of initialization after power-on or after the reset pin is released. The primary purpose of the initialization boot ROM is to find the user's initialization data and code stored in the secondary boot code, usually held in external nonvolatile memory. Initialization programs can be written to external flash via JTAG through the MSSIU interface.

Besides downloading initialization programs, the JTAG port offers nearly full access to the microcontroller, peripherals, and CSL functions to aid in debugging. The JTAG interface can become a bus master on the internal CSI bus. During the system application, the JTAG unit provides observability of the system with minimal system impact.

Debugging the application software is done using a set of debugging tools. A CSI breakpoint unit 150 monitors both the CPU local bus or the CSI bus. Upon a predefined set of conditions, the breakpoint unit can halt or interrupt the execution of the application program. Via JTAG control, the user can then control the behavior of the system.

Tracing of the local CPU bus or the CSI bus is also available through the breakpoint unit and the scratchpad memory. In trace mode, the upper 8K of the scratchpad memory is reclaimed for tracing. Different trace modes are supported and are described in more details in a later chapter.

Using JTAG and the breakpoint unit, it is possible to single step the CPU, the CSL system clock and transactions on the CSI independently of each other. Single stepping on the CSI is done at the transaction level and allows a single transaction to propagate through the CSI pipeline until completed.

A method to provide hierarchical reset capabilities for a configurable system on a chip may apply to a configurable system-on-chip that includes components such as debugging port of type JTAG, a CPU, clock generation logic, memory interfaces, peripherals and configurable logic.

A configurable system-on-chip reset can be separated into 4 main functions: power-on-reset, reset of the device, reset of the user application, and finally CPU reset. The power-on reset is an internally generated reset pulse that is triggered by a power-on condition. It resets all the components in the device and forces a system configuration. The device reset affects the entire device excluding the debugging port. The device reset forces a system configuration. The sources of device reset can be the reset pin and the debugging port. For debugging purposes, the device reset can be either forced or masked by the JTAG port. The application reset affects the part of the system that the user can use, mostly CPU and peripherals. It does not affect debugging support or configuration logic. The configuration relates to the static resources of the system. It includes CSL (programmable logic), ID settings, memory interface static parameters (speed setting, memory width, and address mapping) and clock logic. The configuration may include everything that the user would not have to define on a non-configurable system. The sources of this type of reset are numerous and can include software reset, watchdog reset or any user generated reset. Similarly to the device reset, the application reset can be activated or de-activated by the JTAG port during debugging. Finally, a CPU reset can be generated by the JTAG port during a debug session.

Figure 2:
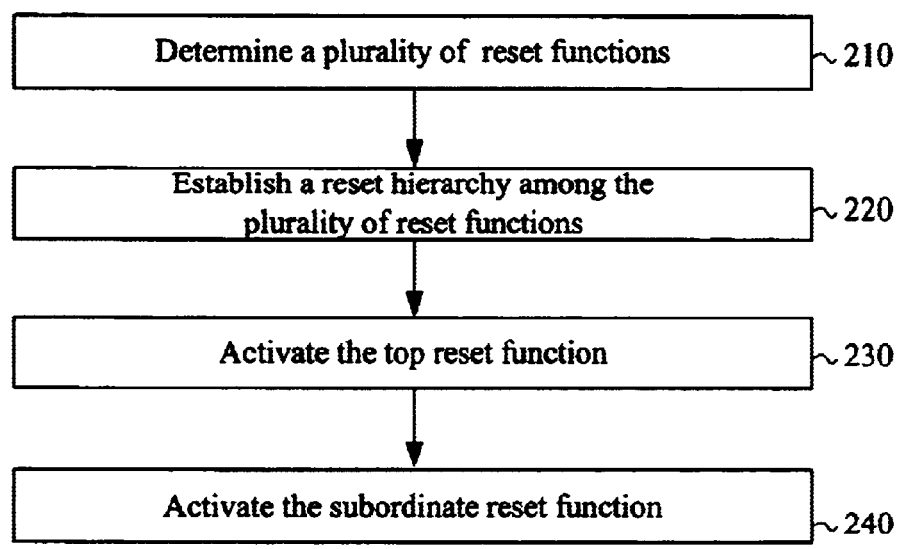
FIG. 2 shows an embodiment of a method to perform hierarchical reset for a system on a chip.

FIG. 2 shows an embodiment of a method for providing hierarchical reset capabilities for a configurable system on a chip. First, a plurality of reset functions are determined, 210. Then, a reset hierarchy is established among the plurality of reset functions, 220. The reset hierarchy can include a top reset function and at least one subordinate reset function. The top reset function is activated, 230, which causes the subordinate reset function to be activated, 240. In one embodiment, the plurality of reset functions include a power-on reset function, a device reset function, an application reset function, and a CPU reset function.

Figure 3:
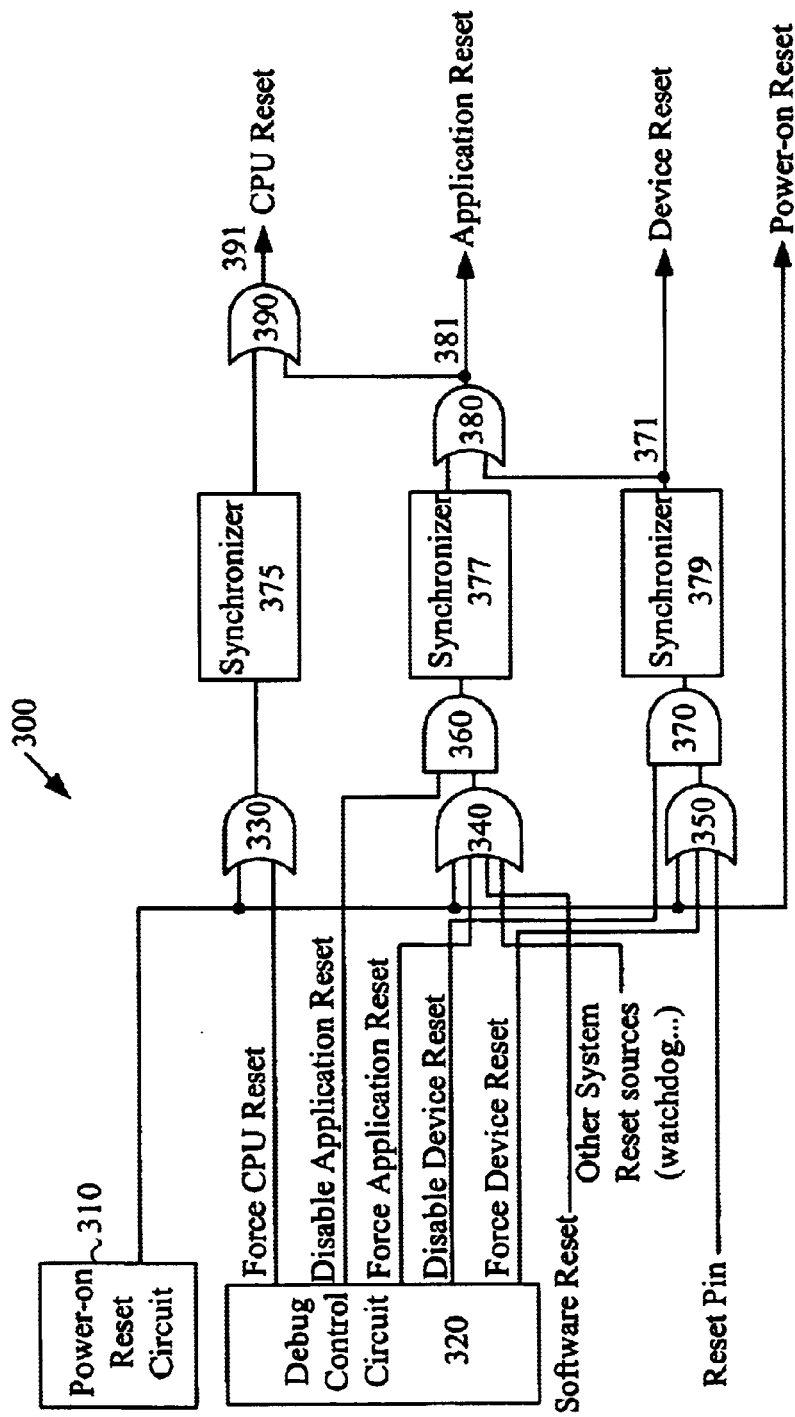
FIG. 3 shows an embodiment of a circuit to perform hierarchical reset for a system on a chip.

FIG. 3 shows an embodiment of an apparatus 300 for performing a method to provide hierarchical reset capabilities for a configurable system on a chip. A power-on reset circuit 310 outputs a power-on reset signal. Debug control circuit 320 outputs a CPU reset signal, an application reset signal, and a device reset signal.

The essence of the reset hierarchy is that any higher level reset affects all lower level resets. Logic gate 330 is an OR gate that has one input connected to the output of the power-on reset circuit to receive the power-on reset signal, another input connected to the CPU reset signal line of the debug control circuit to receive the CPU reset signal. Logic gate 330 outputs the CPU reset signal if either the power-on reset signal or the CPU reset signal is input to logic gate 330. In one embodiment, the CPU reset signal may pass through synchronizer 375 so that the de-assertion of the reset is synchronized to the system clock. The CPU reset signal is input to logic gate 390. Logic gate 390 has a second input connected to application reset line 381 to receive application reset signal. The output 391 of logic gate 390 is high if either input to logic gate 390 is high, so that the CPU is reset if the power-on reset function is activated, the application reset function is activated, or the CPU reset function is activated.

Logic gate 340 has one input connected to the output of the power-on reset circuit and another input to receive an application reset signal from debug control circuit 320 and any other application reset inputs. The output of logic gate 340 outputs an application reset signal if either input to the logic gate 340 is high. The output of logic gate 340 may be connected to synchronizer 377 to synchronize the de-assertion to the system clock. The application reset signal that is output from logic gate 340 may be input to logic gate 380. Logic gate 380 may have another input to receive device reset signal from device reset line 371. Application reset line 381 is high if the device reset function is activated, the power-on reset function is activated, or the application reset function is activated.

Logic gate 350 has an input connected to the output of power-on reset circuit 310. Logic gate 350 also has an input connected to the device reset output line of debug control circuit 320. Logic gate 350 may also have an input connect to the reset pin. The logic gate 350 outputs a device reset signal if either input of logic gate 350 is high. The output of logic gate 350 may be connected to synchronizer 379 to synchronize the de-assertion to the system clock.

For a given reset, the reset sources are "ORed" together and in some cases, "ANDed" with one or more masks 360, 370. The resulting signal may be synchronized to the system clock. The resets (except for the power-on-reset) may be applied asynchronously for immediate effect, but can be de-asserted in a sychronous fashion to meet timing requirements of the memory elements.

In addition, the hierarchical reset apparatus and method can connect these 4 reset signals into a hierarchical structure. Each reset signal gets propagated to all other reset of lower priority as shown in FIG. 3. On top of the reset hierarchy, the power-on reset activates all the other reset conditions. Next, the device reset affects the application reset and the CPU reset. Finally, the application reset affects the CPU reset.

The hierarchical reset method and apparatus create a centralized reset generation logic that is tuned to meet the requirements of configurable system-on-chips. The method may also feature debugging and synchronization capabilities.

These and other embodiments of the present invention may be realized in accordance with these teachings and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

What is claimed is:

1. A method to provide hierarchical reset capabilities for a configurable system on a chip, the method comprising:
   determining a plurality of reset functions; and
   establishing a reset hierarchy among the plurality of reset functions, wherein the configurable system on a chip has configurable logic that is programmable to allow a first instance of the configurable system on a chip to be employed in a first application and a second instance of the configurable system on a chip to be employed in a second application that is different than the first application and the establishing of the reset hierarchy is performed for the first instance and the second instance.

2. The method of claim 1, wherein the reset hierarchy includes a top reset function and at least one subordinate reset function.

3. The method of claim 2, further comprising activating the top reset function.

4. The method of claim 3, wherein activating the top reset function causes the subordinate reset function to be activated.

5. The method of claim 1, wherein the plurality of reset functions include a power-on reset function, a device reset function, an application reset function, and a CPU reset function.

6. An apparatus to provide hierarchical reset capabilities for a configurable system on a chip, said apparatus comprising:
   a power-on reset circuit having an output to send a power-on reset signal that resets substantially all components on the chip;
   a debug control circuit having a CPU reset output to send a CPU reset signal, an application reset output to send an application reset signal, and a device reset output to send a device reset signal that forces a system configuration; and
   a first logic gate having a first input connected to the output of the power-on reset circuit to receive the power-on reset signal and a second input connected to the CPU reset output to receive the CPU output signal from the debug port, and a first logic output to output the CPU reset signal wherein the configurable system on a chip has configurable logic that is programmable to allow a first instance of the configurable system on a chip to be employed in a first application and a second instance of the configurable system on a chip to be employed in a second application that is different than the first application.

7. The apparatus of claim 6 further comprising:
   a second logic gate having a first input connected to the output of the power-on reset circuit to receive the power-on reset signal, a second input connected to the application reset output of the debug port to receive the application reset signal, and a second logic output to output the application reset signal.

8. The apparatus of claim 6 further comprising:
   a third logic gate having a first input connected to the output of the power-on reset circuit to receive the power-on reset signal, a second input connected to the device reset output to receive the device reset signal, and a third logic output to output the device reset signal.

9. An apparatus to provide hierarchical reset capabilities for a configurable system on a chip, the apparatus comprising:
   means for determining a plurality of reset functions; and
   means for establishing a reset hierarchy among the plurality of reset functions,
   means for programming a first instance of the configurable system on a chip to carry out a first application and a second instance of the configurable system on a chip to carry out a second application that is different than the first application and the establishing of the reset hierarchy is performed for the first instance and the second instance.

10. The apparatus of claim 9, wherein the reset hierarchy includes a top reset function and at least one subordinate reset function.

11. The apparatus of claim 10, further comprising means for activating the top reset function.

12. The apparatus of claim 11, wherein activating the top reset function causes the subordinate reset function to be activated.

13. The apparatus of claim 9, wherein the plurality of reset functions include a power-on reset function, a device reset function, an application reset function, and a CPU reset function.

14. An apparatus, comprising:
   a configurable system on a chip having configurable logic and hierarchal reset logic circuit, wherein the configurable logic is programmable to allow a first instance of the configurable system on a chip to be employed in a first application and a second instance of the configurable system on a chip to be employed in a second application that is different than the first application, and the hierarchal reset logic circuit having logic to activate a top reset function that causes a subordinate reset function to be activated.

15. The apparatus of claim 14, wherein the configurable logic is an embedded SRAM configurable system matrix.

* * * * *